United States Patent
Haluba et al.

(10) Patent No.: US 9,401,536 B2
(45) Date of Patent: Jul. 26, 2016

(54) DUAL BAND ANTENNA CONFIGURATION

(71) Applicant: Ayecka Communication Systems, Kfar Saba (IL)

(72) Inventors: Ovadia Haluba, Raanana (IL); Avraham Barda, Hod Hasharon (IL)

(73) Assignee: AYECKA COMMUNICATION SYSTEMS, Kfar-Saba (IL)

( * ) Notice: Subject to any disclaimer, the term of this patent is extended or adjusted under 35 U.S.C. 154(b) by 72 days.

(21) Appl. No.: 14/539,532

(22) Filed: Nov. 12, 2014

(65) Prior Publication Data

US 2016/0134004 A1   May 12, 2016

(51) Int. Cl.
| | |
|---|---|
| H04B 7/185 | (2006.01) |
| H01P 5/12 | (2006.01) |
| H01P 1/20 | (2006.01) |
| H01P 1/213 | (2006.01) |
| H01Q 5/30 | (2015.01) |
| H01Q 13/02 | (2006.01) |
| H04W 88/06 | (2009.01) |

(52) U.S. Cl.
CPC .. *H01P 5/12* (2013.01); *H01P 1/20* (2013.01); *H01P 1/2131* (2013.01); *H01Q 5/30* (2015.01); *H01Q 13/02* (2013.01); *H04B 7/18513* (2013.01); *H04W 88/06* (2013.01)

(58) Field of Classification Search
CPC .......... H01P 1/161; H01P 1/2138; H01Q 5/45
See application file for complete search history.

(56) References Cited

U.S. PATENT DOCUMENTS

| | | | |
|---|---|---|---|
| 3,668,567 A | 6/1972 | Rosen | |
| 4,504,805 A * | 3/1985 | Ekelman, Jr. | H01P 1/2138 333/126 |
| 5,003,321 A * | 3/1991 | Smith | H01Q 5/45 333/126 |
| 6,720,933 B2 | 4/2004 | Hanlin et al. | |
| 6,724,277 B2 | 4/2004 | Holden et al. | |
| 6,816,026 B2 * | 11/2004 | Dybdal | H01P 1/161 333/21 A |
| 7,408,427 B1 * | 8/2008 | Lee-Yow | H01P 1/161 333/126 |
| 8,009,112 B2 | 8/2011 | Buer et al. | |
| 8,334,815 B2 | 12/2012 | Monte et al. | |
| 2013/0342282 A1 | 12/2013 | Uher | |

* cited by examiner

*Primary Examiner* — Edward Urban
*Assistant Examiner* — Mohammed Rachedine
(74) *Attorney, Agent, or Firm* — Browdy and Neimark, PLLC

(57) ABSTRACT

A dual band antenna configuration constituted of: a waveguide extending from a proximal section to a high frequency band section; a first high frequency band port extending from the high frequency band section of the waveguide; a first low frequency band port extending, from an outer surface of a low frequency section of the waveguide, along a first radial path; a second low frequency band port extending, from the outer surface of the low frequency section of the waveguide, along a second radial path, the second radial path orthogonal to the first radial path; and a 180 degree hybrid coupler, wherein a first port of the 180 degree hybrid coupler in electrical communication with the first low frequency band port and a second port of the 180 degree hybrid coupler, different than the first port thereof, in electrical communication with the second low frequency band port.

22 Claims, 4 Drawing Sheets

```
┌─────┬──────────────────────────────────────────────────────────────────┐
│1000 │ TRANSMIT FIRST LOW BAND SIGNAL BETWEEN HORN AND FIRST LOW        │
│     │ BAND PORT EXTENDING FROM WAVEGUIDE ALONG FIRST PATH, HORN        │
│     │ COUPLED TO PROXIMAL SECTION OF WAVEGUIDE, OPT.                   │
│     │ TRANSMISSION ONLY THROUGH PORTION OF WAVEGUIDE DEVOID OF         │
│     │ BARRIERS                                                         │
└─────┴──────────────────────────────────────────────────────────────────┘
                                    │
┌─────┬──────────────────────────────────────────────────────────────────┐
│1010 │ TRANSMIT SECOND LOW BAND SIGNAL BETWEEN HORN AND SECOND          │
│     │ LOW BAND PORT EXTENDING FROM WAVEGUIDE ALONG SECOND              │
│     │ PATH ORTHOGONAL TO FIRST PATH, OPT. TRANSMISSION ONLY            │
│     │ THROUGH PORTION OF WAVEGUIDE DEVOID OF BARRIERS                  │
└─────┴──────────────────────────────────────────────────────────────────┘
                                    │
┌─────┬──────────────────────────────────────────────────────────────────┐
│1020 │ TRANSMIT FIRST HIGH BAND SIGNAL BETWEEN HORN AND FIRST HIGH      │
│     │ BAND PORT OF WAVEGUIDE; OPT. EXTENDING ALONG LONGITUDINAL        │
│     │ AXIS; OPT. TRANSMISSION THROUGH TAPERED PORTION OF               │
│     │ WAVEGUIDE, OPT. DIMENSIONED TO PREVENT LOW BAND SIGNALS          │
│     │ FROM PROCEEDING THROUGH TAPER, AND MULTIMODE MATCH               │
│     │ WAVEGUIDE; OPT. HIGH BAND = KA BAND, LOW BAND = KU BAND          │
└─────┴──────────────────────────────────────────────────────────────────┘
                                    │
┌─────┬──────────────────────────────────────────────────────────────────┐
│1030 │ TRANSMIT LOW BAND SIGNALS BETWEEN RESPECTIVE LOW BAND            │
│     │ PORTS AND RESPECTIVE FIRST PORTS OF 180 DEG. HYBRID              │
│     │ COUPLER, OPT. MAGIC TEE, FIRST PORTS = COLLINEAR PORTS           │
└─────┴──────────────────────────────────────────────────────────────────┘
                                    │
┌─────┬──────────────────────────────────────────────────────────────────┐
│1040 │ (OPT.) LOW BAND SIGNALS TRANSMISSIONS RESPONSIVE TO PAIR OF      │
│     │ STUBS EXTENDING FROM WAVEGUIDE AND OPPOSING LOW BAND             │
│     │ PORTS                                                            │
└─────┴──────────────────────────────────────────────────────────────────┘
                                    │
┌─────┬──────────────────────────────────────────────────────────────────┐
│1050 │ (OPT.) ATTENUATE HIGH FREQUENCY SIGNAL EXITING LOW BAND          │
│     │ PORTS TO 180 DEGREE HYBRID COUPLER                               │
└─────┴──────────────────────────────────────────────────────────────────┘
                                    │
┌─────┬──────────────────────────────────────────────────────────────────┐
│1060 │ (OPT.) TRANSMIT SECOND HIGH BAND SIGNAL BETWEEN HORN AND         │
│     │ SECOND HIGH BAND PORT OF WAVEGUIDE, POLARITY OF SECOND           │
│     │ HIGH BAND PORT ORTHOGONAL TO POLARITY OF FIRST HIGH BAND         │
│     │ PORT                                                             │
└─────┴──────────────────────────────────────────────────────────────────┘
                                    │
┌─────┬──────────────────────────────────────────────────────────────────┐
│1070 │ (OPT.) POLARIZE FIRST AND SECOND HIGH BAND SIGNALS               │
└─────┴──────────────────────────────────────────────────────────────────┘
                                    │
┌─────┬──────────────────────────────────────────────────────────────────┐
│1080 │ (OPT.) LOW BAND SIGNALS TRANSMITTED BETWEEN: SUM PORT OF         │
│     │ 180 DEG. COUPLER AND RESPECTIVE PORT OF 90 DEG. COUPLER;         │
│     │ AND DIFFERENCE PORT OF 180 DEG. COUPLER AND RESPECTIVE           │
│     │ PORT OF 90 DEG. COUPLER                                          │
└─────┴──────────────────────────────────────────────────────────────────┘
```

FIG. 3

DUAL BAND ANTENNA CONFIGURATION

FIELD OF THE INVENTION

The invention relates generally to the field of satellite communications and antenna systems, and particularly to a dual band antenna configuration for dual frequency band transmission.

BACKGROUND OF THE INVENTION

Satellite communication is widely used for many applications such as television and radio broadcast, and Internet data transmission. Typically, the communication between the satellite and household satellite dishes are in the $K_u$ frequency band, i.e. 12-18 GHz. In order to allow two way communication between the user and the satellite, a lower portion of the $K_u$ band is utilized for receiving data from the satellite and an upper portion of the $K_u$ band is utilized for transmitting data to the satellite. Unfortunately, the upper and lower portions of the $K_u$ band are close to each other, and thus the number of available frequencies is not sufficient for necessary data transmission.

Additionally, it is generally desirable to simultaneously provide to a single antenna configuration a pair of signals, exhibiting the same frequency and orthogonal polarities, or opposing hands of circular polarities, to thus double the amount of signals being provided with the same number of frequencies. In order to isolate the different signals from each other, an appropriate structure must be provided. U.S. Pat. No. 6,724,277, issued Apr. 20, 2004 to Holden et al., the entire contents of each of which incorporated herein by reference, describes one such structure where septum plates are provided to isolate the signal from each other. Unfortunately, such septum plates would interfere with a separate frequency band, thereby preventing multiple frequency use of the antenna configuration. As a solution, Holden proposes to provide a separate conductor, extending along the length of the waveguide, for each frequency. However, such a construction adds cost and complexity to the antenna configuration.

U.S. patent application publication US 2013/0342282, published Dec. 26, 2013 to UHER, describes using four ports to receive the separate signals, two opposing ports for each signal, with each pair of ports orthogonal to the other pair of ports. Such a construction also adds cost and complexity to the antenna configuration.

What is desired, and not supplied by the prior art, is a simplified multi-frequency band antenna configuration which allows for simultaneous receiving/transmission of two separate signals, exhibiting the same frequency and polarities orthogonal to each other, or opposing hands of circular polarities.

SUMMARY

Accordingly, it is a principal object of the present invention to overcome at least some of the disadvantages of the prior art. In certain embodiments this is provided by a dual band antenna configuration comprising: a waveguide extending from a proximal section to a high frequency band section; a first high frequency band port extending from the high frequency band section of the waveguide; a first low frequency band port extending, from an outer surface of a low frequency section of the waveguide, along a first radial path; a second low frequency band port extending, from the outer surface of the low frequency section of the waveguide, along a second radial path, the second radial path orthogonal to the first radial path; and a 180 degree hybrid coupler, wherein a first port of the 180 degree hybrid coupler in electrical communication with the first low frequency band port and a second port of the 180 degree hybrid coupler, different than the first port thereof, in electrical communication with the second low frequency band port.

In one embodiment, the antenna configuration further comprises: a first stub, the first stub extending from the outer surface of the waveguide and opposing the first low frequency band port; and a second stub, the second stub extending from the outer surface of the waveguide and opposing the second low frequency band port. In another embodiment, the 180 degree hybrid coupler is a magic tee, the first port of the 180 degree hybrid coupler being a first collinear port of the magic tee and the second port of the 180 degree hybrid coupler being a second collinear port of the magic tee.

In one embodiment, the proximal section and the low frequency band section of the waveguide are each devoid of any barriers. In another embodiment, the waveguide tapers from the low frequency band section to the high frequency band section. In one further embodiment, the antenna configuration further comprises a second high frequency band port extending, from the outer surface of the waveguide at the high frequency band section, along a third radial path, the first high frequency band port extending along a longitudinal axis of the waveguide such that the polarity of the first high frequency band port is orthogonal to the polarity of the second high frequency band port, wherein the first and second high frequency band ports are arranged to transmit to, or receive from, the waveguide signals exhibiting frequencies in a high frequency band, wherein the first and second low frequency band ports are arranged to transmit to, or receive from, the waveguide signals exhibiting frequencies in a low frequency band, and wherein the taper is dimensioned such that: the low frequency band signals do not proceed from the low frequency band second to the high frequency band section; and the high frequency band signals are multimode matched.

In one embodiment, the antenna configuration further comprises a pair of high frequency band filters, wherein the first high frequency band port is arranged to transmit to, or receive from, the waveguide signals exhibiting frequencies in a high frequency band, and wherein each of the high frequency band filters is arranged to attenuate signal frequencies within the high frequency band, an input of each of the pair of high frequency band filters coupled to a respective one of a sum port and a difference port of the 180 degree hybrid coupler. In another embodiment, the antenna configuration further comprises: a second high frequency band port extending, from the outer surface of the waveguide at the high frequency band section, along a third radial path, the first high frequency band port extending along a longitudinal axis of the waveguide such that the polarity of the first high frequency band port is orthogonal to the polarity of the second high frequency band port; and a polarizer positioned within the waveguide.

In one embodiment, the antenna configuration further comprises a 90 degree hybrid coupler, each of a pair of terminals of the 90 degree hybrid coupler in electrical communication with a respective one of a sum port and a difference port of the 180 degree hybrid coupler. In another embodiment, the first high frequency band port is arranged to transmit to, or receive from, the waveguide signals exhibiting frequencies in a high frequency band, wherein the first and second low frequency band ports are arranged to transmit to, or receive from, the waveguide signals exhibiting frequencies in a low frequency band, and wherein the high frequency band is a predetermined portion of the Ka band and the low frequency band is a predetermined portion of the Ku band.

In one independent embodiment, a dual band antenna transmission method is provided, the method comprising: transmitting a first low frequency band signal between a proximal section of a waveguide and a first low frequency band port extending, from an outer surface of the waveguide, along a first radial path; transmitting a second low frequency band signal between the proximal section of the waveguide and a second low frequency band port extending, from the outer surface of the waveguide, along a second radial path, the second radial path orthogonal to the first radial path; transmitting a first high frequency band signal between the proximal section of the waveguide and a first high frequency band port extending from a high frequency band section of the waveguide; and transmitting the first and second low frequency band signals between the respective first and second low band frequency ports and respective first ports of a 180 degree hybrid coupler.

In one embodiment, the first and second low frequency band signal transmission between the proximal section of the waveguide and the first and second low frequency band ports is responsive to: a first stub extending from the outer surface of the waveguide and opposing the first low frequency band port; and a second stub extending from the outer surface of the waveguide and opposing the second low frequency band port. In another embodiment, the 180 degree hybrid coupler is a magic tee, the respective first ports of the 180 degree hybrid coupler being collinear ports of the magic tee.

In one embodiment, the first low frequency band signal transmission between the proximal section of the waveguide and the first low frequency band port and the second low frequency band signal transmission between the proximal section of the waveguide and the second low frequency band port is only through a portion of the waveguide devoid of any barriers. In another embodiment, the first high frequency band signal transmission between the proximal section of the waveguide and the first high frequency band port is through a tapered portion of the waveguide.

In one further embodiment, the method further comprises: transmitting a second high frequency band signal between the proximal section of the waveguide and a second high frequency band port extending from the outer surface of the waveguide along a third radial path, the first high frequency band port extending along a longitudinal axis of the waveguide such that the polarity of the first high frequency band port is orthogonal to the polarity of the second high frequency band port; and responsive to the dimensions of the tapered portion of the waveguide: preventing the first low frequency band signal and the second low frequency band signal from proceeding through the tapered portion of the waveguide; and multimode matching the first and second high frequency band signals.

In one embodiment, the method further comprises: attenuating a signal exhibiting a frequency within the high frequency band which exits the first low frequency band port towards the 180 degree hybrid coupler; and attenuating a signal exhibiting a frequency within the high frequency band which exits the second low frequency band port towards the 180 degree hybrid coupler. In another embodiment, the method further comprises: transmitting a second high frequency band signal between the proximal section of the waveguide and a second high frequency band port extending from the outer surface of the waveguide along a third radial path; and polarizing the transmitted first and second high frequency band signals, wherein the first high frequency band port extends along a longitudinal axis of the waveguide such that the polarity of the first high frequency band port is orthogonal to the polarity of the second high frequency band port.

In one embodiment, the method further comprises: transmitting the first and second low frequency band signals between a sum port of the 180 degree hybrid coupler and a respective port of a 90 degree hybrid coupler; and transmitting the first and second low frequency band signals between a difference port of the 180 degree hybrid coupler and a respective port of the 90 degree hybrid coupler. In another embodiment, the high frequency band is a predetermined portion of the $K_a$ band and the low frequency band is a predetermined portion of the $K_u$ band.

Additional features and advantages of the invention will become apparent from the following drawings and description.

BRIEF DESCRIPTION OF THE DRAWINGS

For a better understanding of various embodiments of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 3 illustrates a high level flow chart of a method of dual band antenna transmission, according to certain embodiments.

DETAILED DESCRIPTION

Figure 1A:
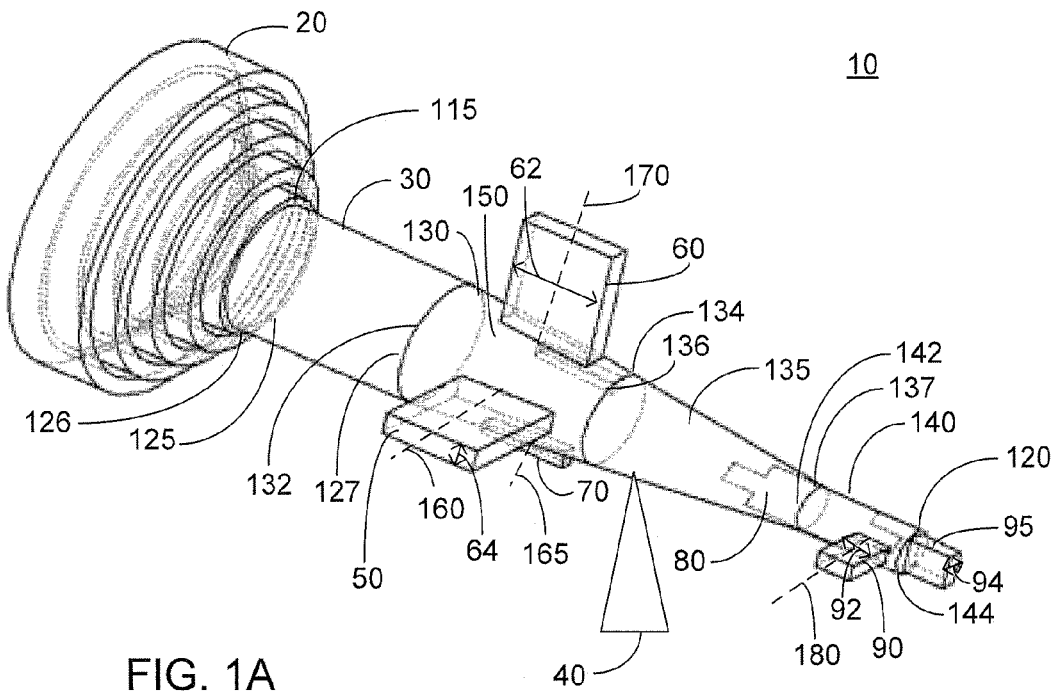
FIGS. 1A-1D illustrate various high level views of various components of a first dual band antenna configuration, according to certain embodiments.
Figure 1B:
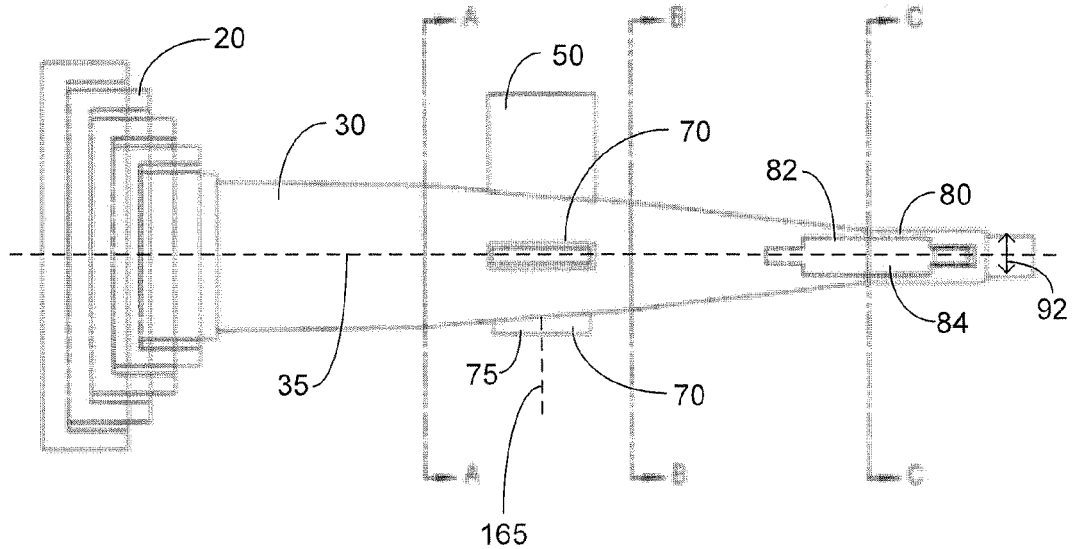

Before explaining at least one embodiment in detail, it is to be understood that the invention is not limited in its application to the details of construction and the arrangement of the components set forth in the following description or illustrated in the drawings. The invention is applicable to other embodiments being practiced or carried out in various ways. Also, it is to be understood that the phraseology and terminology employed herein is for the purpose of description and should not be regarded as limiting.

FIGS. 1A-1D illustrate various high level views of various components of an antenna configuration 10, according to certain embodiments. Antenna configuration 10 comprises: a horn 20; a waveguide 30, exhibiting a longitudinal axis 35; a base 40; a first low frequency band port 50; a second low frequency band port 60; a pair of stubs 70, preferably closed stubs; a polarizer 80; a first high frequency band port 90; a second high frequency band port 95; a 180 degree hybrid coupler 100; and a pair of high frequency rejection filters 105.

In one embodiment, horn 20 comprises a corrugated horn. In another embodiment, horn 20 comprises a smooth conical horn. In one embodiment, polarizer 80 comprises a 90 degree phase shifter. In one further embodiment, the 90 degree phase shifter comprises dielectric material. Preferably, as illustrated in FIG. 1D, 180 degree hybrid coupler 100 is a magic tee and will be described herein as such.

Waveguide 30 extends from a proximal end 115 to a distal end 120, via a proximal section 125, a low frequency band orthomode section 130, a high frequency band matching section 135 and a high frequency band orthomode section 140. In particular, proximal end 115 of waveguide 30 is defined by the proximal end 126 of proximal section 125, i.e. the end of proximal section 125 which is farthest from distal end 120. The proximal end 132 of low frequency band orthomode section 130 meets the distal end 127 of proximal section 125 and the distal end 134 of low frequency band orthomode section 130 meets the proximal end 136 of high frequency band matching section 135. The distal end 137 of high frequency band matching section 135 meets the proximal end 142 of high frequency band orthomode section 140 and the distal end 144 of high frequency band orthomode section 140 defines distal end 120 of waveguide 30. Waveguide 30 is described as comprising a plurality of sections, however this is not meant to limit waveguide 30 to having a plurality of sections attached to each other. In one embodiment, as will be described below, waveguide 30 is manufactured as a unibody, i.e. from a single piece of material and not from several pieces attached to each other. Low frequency band orthomode section 130 tapers from proximal end 132 to distal end 134 thereof and high frequency band matching section 135 tapers from proximal end 136 to distal end 137 thereof. In one embodiment, as will be described below, low frequency band orthomode section 130 tapers at a different angle than the tapering of high frequency band matching section 135. Waveguide 30 is illustrated as a circular waveguide, however this is not meant to be limiting in any way and waveguide 30 may be shaped in any appropriate geometric shape, such as a rectangle, without exceeding the scope.

Horn 20 is coupled to proximal end 115 of waveguide 30. First low frequency band port 50 extends along a radial path 160 from a respective opening in outer surface 150 of low frequency band orthomode section 130 of waveguide 30 such that the polarity of first low frequency band port 50 is orthogonal to radial path 160. Particularly, in one embodiment first low frequency band port 50 comprises an elongated rectangular waveguide, the length 62 of the rectangular waveguide in parallel with longitudinal axis 35 and the width 64 of the rectangular waveguide orthogonal to longitudinal axis 35. Second low frequency band port 60 extends along a radial path 170 from a respective opening in outer surface 150 of low frequency band orthomode section 130 of waveguide 30 such that the polarity of second low frequency band port 60 is orthogonal to radial path 170. Particularly, in one embodiment second low frequency band port 60 comprises a rectangular waveguide, the length 62 of the rectangular waveguide in parallel with longitudinal axis 35 and the width 64 of the rectangular waveguide orthogonal to longitudinal axis 35. Radial paths 160 and 170 are each orthogonal to longitudinal axis 35 and are orthogonal to each other, such that first low frequency band port 50 is orthogonal to second low frequency band port 60. The term 'radial path', as used herein, is meant as a path extending out from any geometrical structure and is not meant to be limited to a path extending from a circular structure. In the embodiment where each of first low frequency band port 50 and second low frequency band port 60 comprises an elongated rectangular waveguide, width 64 of the rectangular waveguide of second low frequency band port 60 is in parallel with radial path 160 and width 64 of the rectangular waveguide of first low frequency band port 50 is in parallel with radial path 170. As a result, the polarity of low frequency band port 50 is in parallel with radial path 170 and the polarity of low frequency band port 60 is in parallel with radial path 160. The above has been described in an embodiment where the polarity of low frequency band port 50 is in parallel with radial path 170 and the polarity of low frequency band port 60 is in parallel with radial path 160, however this is not meant to be limiting in any way. Particularly, first low frequency band port 50 and second low frequency band port 60 can be of any appropriate geometric shape such that the polarities thereof are orthogonal to each other.

Each stub 70 extends from a respective opening in outer surface 150 of low frequency band orthomode section 130 of waveguide 30 along a respective radial path 165, orthogonal to longitudinal axis 35. Each stub 70 opposes a respective one of first and second low frequency band ports 50, 60, i.e. defines a common plane with the respective one of first and second low frequency band ports 50, 60. As a result, stubs 70 are orthogonal to each other. As will be described below, in one embodiment the extension length of each stub 70, measured from outer surface 150 to an end 75 thereof, is ¼ of the wavelength of the center frequency of a predetermined low frequency band. Optionally, in the embodiment where each of first low frequency band port 50 and second low frequency band port 60 comprises an elongated rectangular waveguide, each stub 70 is elongated rectangular shaped, the length thereof parallel to length 62 of the respective one of first low frequency band port 50 and second low frequency band port 60 and the width thereof parallel to width 64 of the respective one of first low frequency band port 50 and second low frequency band port 60.

Polarizer 80 is positioned within waveguide 30, a proximal section 82 of polarizer 80 situated within high frequency band matching section 135 and a distal section 84 of polarizer 80 situated within high frequency band orthomode section 140. First high frequency band port 90 extends along a radial path 180 from a respective opening in outer surface 150 of high frequency band orthomode section 140 of waveguide 30, radial path 180 orthogonal to longitudinal axis 35, such that the polarity of first high frequency band port 90 is orthogonal to radial path 180 and longitudinal axis 35. Particularly, in one embodiment first high frequency band port 90 comprises an elongated rectangular waveguide, the length 92 of the rectangular waveguide in parallel with longitudinal axis 35 and the width 94 of the rectangular waveguide orthogonal to longitudinal axis 35. Second high frequency band port 95 extends along longitudinal axis 35 from distal end 120 of waveguide 30, such that first high frequency band port 90 is orthogonal to second high frequency band port 95. Particularly, the polarity of first high frequency band port 90 is orthogonal to radial path 180 and longitudinal axis 135, and the polarity of second high frequency band port 95 is in parallel with radial path 180. In one embodiment, second high frequency band port 95 comprises an elongated rectangular waveguide, the length 92 of the rectangular waveguide orthogonal to longitudinal axis 35 and radial path 180, and the width 94 of the rectangular waveguide in parallel with radial path 180. In another embodiment, first high frequency band port 90 and second high frequency band port 95 may be of any appropriate geometric state such that the polarities thereof are orthogonal to each other. In one embodiment, each of first and second high frequency band ports 90, 95 is coupled to distal section 84 of polarizer 80.

The above has been described in an embodiment where polarizer 80 is provided, thereby two linear polarized high frequency band signals are polarized by polarizer 80 to become a right hand circularly polarized signal and a left hand circularly polarized signal, as will be described below. In another embodiment (not shown), polarizer 80 is not provided and first and second high frequency band ports 90, 95 provide for dual linear polarization. In such an embodiment, first and second high frequency band ports are arranged such that the polarity of first high frequency band port 90 exhibits a 45 degree angle with each of the polarity of first low frequency band port 50 and the polarity of second low frequency band port 60 while maintaining orthogonality with the polarity of second high frequency band port 95. Particularly, width 94 of first high frequency band port 90 exhibits a 45 degree angle with each of radial path 160 and radial path 170.

Figure 1C:
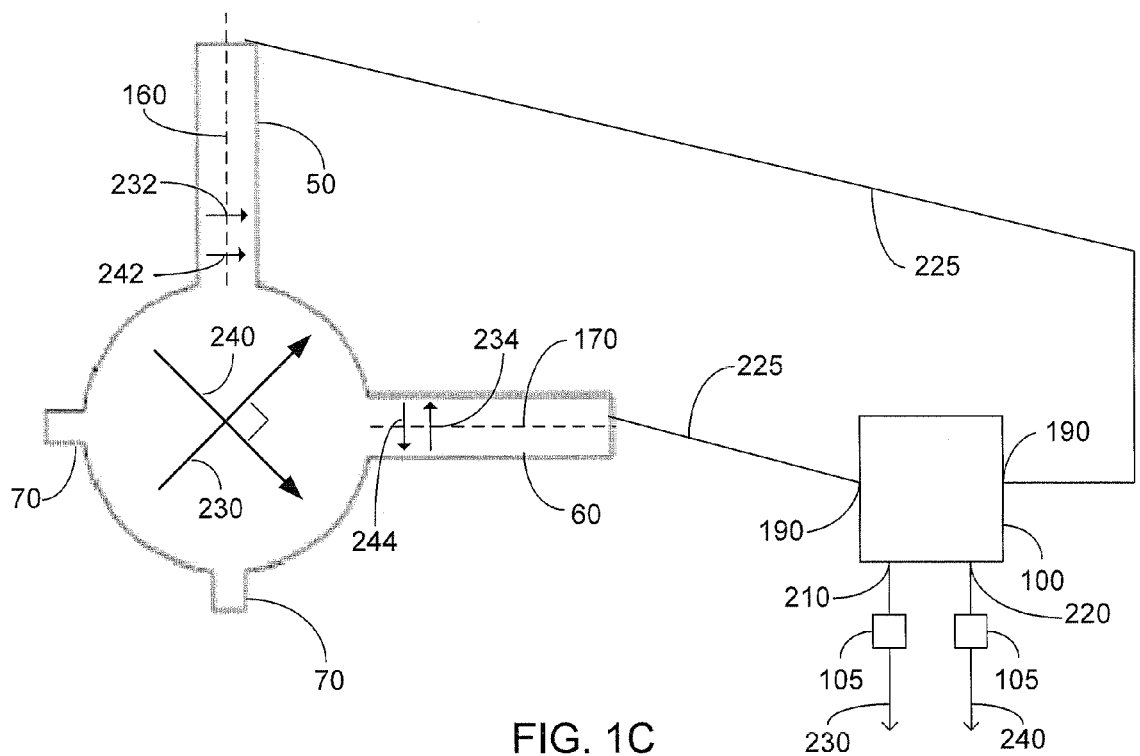
Figure 1D:
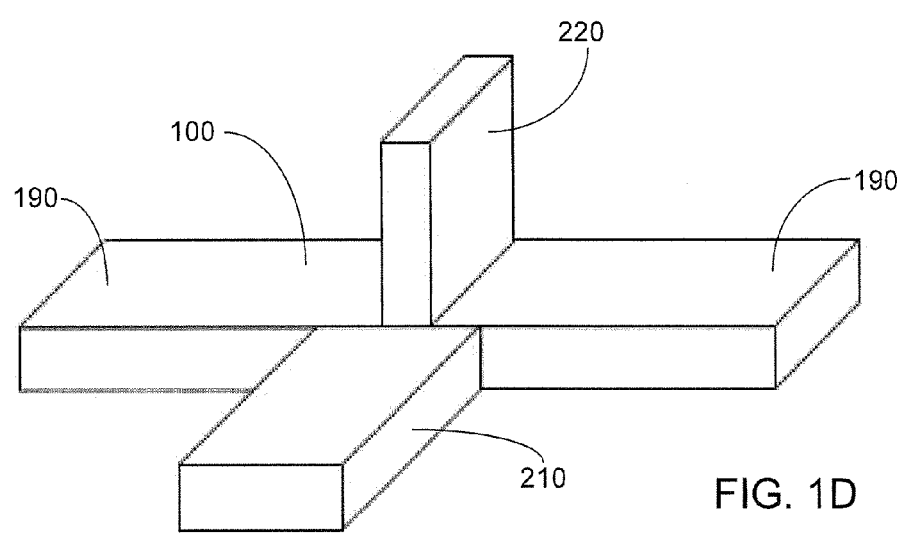

As illustrated in FIG. 1C, first and second low frequency band ports 50, 60 are each in electrical communication with a respective port of magic tee 100, illustrated in FIG. 1D. In particular, each of first and second low frequency band ports 50, 60 is in electrical communication with a respective collinear port 190 of magic tee 100, collinear ports 190 exhibiting a common longitudinal axis and orthogonal to a sum port 210 and a difference port 220. In one embodiment, each of first and second low frequency band ports 50, 60 abuts, and is juxtaposed with, the respective collinear port 190 of magic tee 100. Each of sum port 210 and difference port 220 of magic tee 100 is in electrical communication with an input of a respective high frequency rejection filter 105. In one embodiment, each of sum port 210 and difference port 220 of magic tee 100 abuts, and is juxtaposed with, the input of the respective high frequency rejection filter 105. In another embodiment (not shown), high frequency rejection filters 105 are coupled between first and second low frequency band ports 60, 70 and collinear ports 190 of magic tee 100. The connections 225 between first and second low frequency band ports 60, 70 and collinear ports 190 of magic tee 100 are illustrated as being narrower than first and second low frequency band ports 60, 70, however this is not meant to be limiting in any way. Preferably, connections 225 exhibit the same cross section size as first and second low frequency band ports 60, 70, and collinear ports 190.

Waveguide 30 is coupled to base 40. Preferably, proximal section 125 and low frequency band orthomode section 130 are devoid of any barriers, such as described in U.S. Pat. No. 3,668,567, issued on Jun. 6, 1972 to Rosen, the entire contents of which incorporated herein by reference, and in U.S. Pat. No. 6,724,277, issued Apr. 20, 2004 to Holden et al. Additionally, proximal section 125 and low frequency band orthomode section 130 do not contain any additional inner conductors, such as described in U.S. Pat. No. 6,724,277, issued Apr. 20, 2004 to Holden et al. In one embodiment, proximal section 125 and low frequency band orthomode section 130 of waveguide 30 are hollow. In another embodiment, waveguide 30, first and second low frequency band ports 50, 60, polarizer 80, first and second high frequency band ports 90, 95, magic tee 100 and high frequency rejection filters 105 are manufactured as a unibody, i.e. from a single piece of material.

In operation, a linearly polarized first low frequency band signal 230 is transmitted between horn 20 and first low frequency band port 50, and a linearly polarized second low frequency band signal 240 is transmitted between horn 20 and second low frequency band port 60. The polarization of second low frequency band signal 240 is orthogonal to the polarization of the first low frequency band signal 230. In one embodiment, first and second low frequency band signals 230, 240 are received at horn 20 from an external antenna, optionally an antenna of a satellite, further optionally via a reflector juxtaposed with horn 20. In another embodiment, the external antenna is a ground based antenna. First and second low frequency band signals 230, 240 propagate through waveguide 30 to first and second low frequency band ports 50, 60, i.e. antenna configuration 10 is in a low frequency band receiving mode. In another embodiment, first and second low frequency band signals 230, 240 are output by first and second low frequency band ports 50, 60 to waveguide 30, i.e. antenna configuration 10 is in a low frequency band transmission mode. First and second low frequency band signals 200, 210 propagate through waveguide 30 to horn 20, where they are then transmitted to the external antenna, which as described above is optionally an antenna of a satellite, further optionally via a reflector juxtaposed with horn 20. The below will be described for the embodiment where antenna configuration 10 is in a low frequency band receiving mode. The operation of antenna configuration 10 in the low frequency band transmission mode is reciprocal and otherwise identical to the low frequency band receiving mode and in the interest of brevity will not be described.

As illustrated in FIG. 1C, the polarity of first low frequency band signal 230 is orthogonal to the polarity of second low frequency band signal 240. The polarity of first low frequency band signal 230 exhibits a 45 degree angle with each of radial paths 160 and 170, and the polarity of second low frequency band signal 240 exhibits a 45 degree angle with radial path 170 and a 135 degree angle with radial path 160. As a result, a half 232 of first low frequency band signal 230 and a half 242 of second low frequency band signal 240 enters first low frequency band port 50. The polarity of half 232 of first low frequency band signal 230 is the same as the polarity of half 242 of second low frequency band signal 240. Additionally, a half 234 of first low frequency band signal 230 and a half 244 of second low frequency band signal 240 enters second low frequency band port 60. The polarity of half 234 of first low frequency band signal 230 opposes the polarity of half 244 of second low frequency band signal 240. Half 232 is the component of first low frequency band signal 230 along a first axis of a coordinate system and half 234 is the component of first low frequency band signal 230 along a second axis of the coordinate system. Half 242 is the component of second low frequency band signal 240 along the first axis of the coordinate system and half 244 is the component of second low frequency band signal 240 along the second axis in the coordinate system.

Half 232 of first low frequency band signal 230 and half 242 of second low frequency band signal 240 enter the respective collinear port 190 of magic tee 100 coupled to first low frequency band port 50. Additionally, half 234 of first low frequency band signal 230 and half 244 of second low frequency band signal 240 enter the respective collinear port 190 of magic tee 100 coupled to second low frequency band port 60. First and second low frequency band signals 230, 240 are output at sum port 210 and difference port 220 of magic tee 100. As known to those skilled in the art at the time of the invention, magic tee 100 is arranged to output a sum of the signals entering collinear ports 190 at sum port 210 and is further arranged to output a difference of the signals entering collinear ports 190 at difference port 220. Particularly, first low frequency band signal 230 is output from sum port 210 and second low frequency band signal 240 is output from difference port 220. The structure of magic tee 100 causes collinear ports 190 to be isolated from each other thereby not allowing first and second low frequency band signal 230, 240 to return back to waveguide 30.

The wall of waveguide 30 presents an electrical connection between first low frequency band port 50 and second low frequency band port 60, thus portions of first and second low frequency band signals 230, 240 may enter the wrong one of first and second low frequency band ports 50, 60. Stubs 70 are arranged to improve the isolation between first low frequency band port 50 and second low frequency band port 60. In particular, each stub 70 is arranged to present an open circuit for a signal whose wavelength equals ¼ of the extension length thereof. Thus, the extension length of each stub 70, measured from outer surface 150 to end 75 thereof, is arranged to be ¼ of the wavelength of the middle frequency of the low frequency band. For example, if the low frequency band is 12-13 GHz, the extension length of each stub 70 is arranged to ¼ of the wavelength of 12.5 GHz, i.e. about 6 mm.

The tapering structure of waveguide 30 prevents first and second low frequency band signals 230, 240 from advancing towards high frequency band orthomode section 140 and disrupting the transmission/receiving of signals from first and second high frequency band ports 90, 95. In particular, the size of the cross section at distal end 134 of low frequency band orthomode section 130 is arranged such that first and second low frequency band signals 230, 240 can't proceed into high frequency band matching section 135, as known to those skilled in the art at the time of the invention. As described above in relation to first and second low frequency band ports 50, 60, first and second high frequency band ports 90, 95 can operate either as transmitting ports or receiving ports. The operation as receiving ports is identical, albeit reciprocal, to the operation as transmitting ports and in the interest of brevity only the operation of first and second high frequency band ports 90, 95 as transmitting ports will be described. First and second high frequency band ports 90, 95 are arranged to output to waveguide 30 high frequency band signals exhibiting orthogonal polarities with each other. Polarizer 80 is arranged to polarize the phase of the signals output by first and second high frequency band ports 90, 95 such that the signals become circularly polarized. The circularly polarized signals propagate through waveguide 30 to horn 20. The dimensions of the tapering of high frequency band matching section 135, i.e. the angle and length thereof, are arranged to improve the multimode matching of the high frequency band signals and to maintain them in the desired mode, as known to those skilled in the art at the time of the invention. As described above, the angle and length of the tapering of high frequency band matching section 135 are arranged to reduce the cross section of distal end 134 of low frequency band orthomode section 130 such that first and second low frequency band signals 230, 240 can't proceed into high frequency band matching section 135.

As described above, proximal section 125 and low frequency band orthomode section 130 are devoid of any barriers. Advantageously, the lack of any barrier allows for the transmission of high frequency band signals without being distorted.

Portions of the high frequency band signals may enter low frequency band ports 50, 60 and disrupt the received low frequency band signal 230, 240. High frequency rejection filters 105 are therefore arranged to attenuate the high frequency band signals before exiting antenna configuration 10. In one embodiment, the low frequency band is a predetermined portion of the band and the high frequency band is a predetermined portion of the $K_a$ band. As described above, the $K_u$ band is defined as the frequency band of 12-18 GHz. The $K_a$ band is defined as the frequency band of 26.5-40 GHz.

Figure 2:
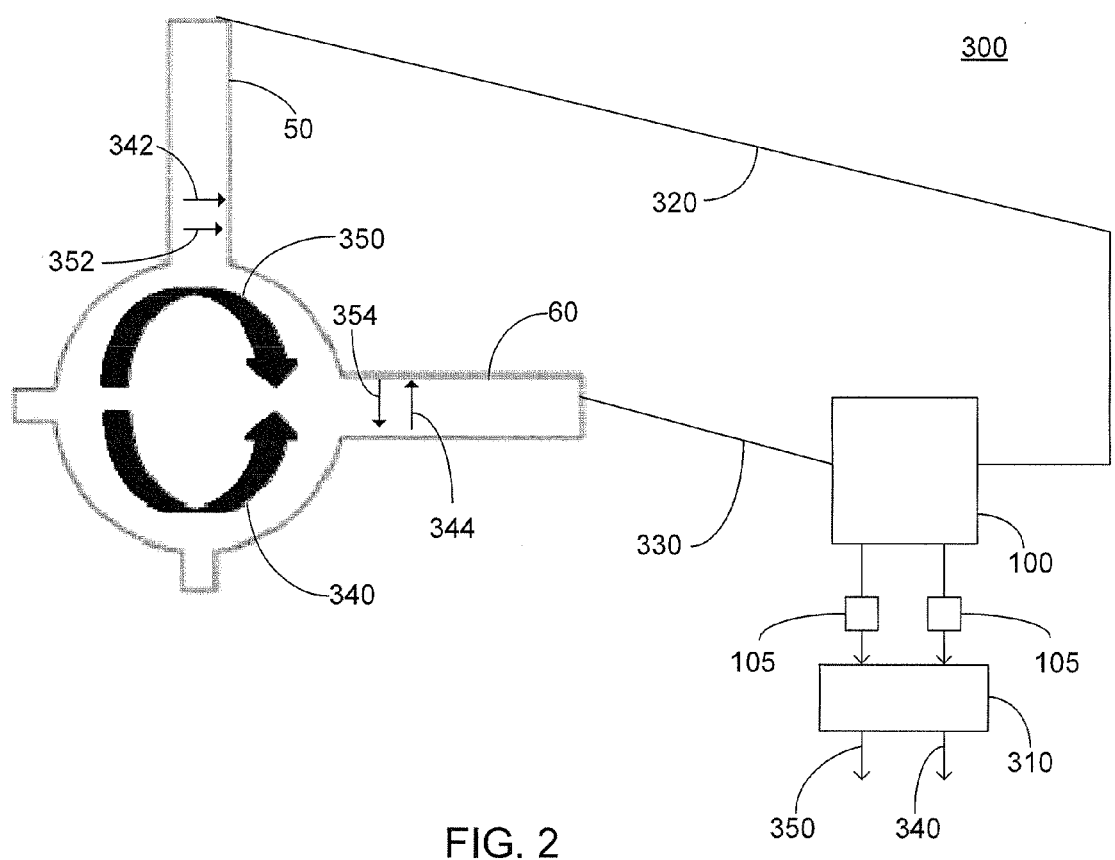
FIG. 2 illustrates a high level cut away view of a low frequency band section of a second dual band antenna configuration, according to certain embodiments.

FIG. 2 illustrates a high level cut away view of a portion of an antenna configuration 300, according to certain embodiments. Antenna configuration 300 is in all respects similar to antenna configuration 10 of FIGS. 1A-1D, with the addition of a 90 degree hybrid coupler 310. Each of a first and second input of 90 degree hybrid coupler 310 is in electrical communication with the output of a respective one of pair of high frequency rejection filters 105. In one embodiment, each first and second input of 90 degree hybrid coupler 310 is juxtaposed with, and abuts, the respective high frequency rejection filter 105. In another embodiment, 90 degree hybrid coupler 310 is printed on a circuit board of a system in communication with antenna configuration 300 (not shown). In another alternative embodiment, 90 degree hybrid coupler 310 comprises a 90 degree waveguide hybrid coupler. In the embodiment of antenna configuration 300, the electrical length of connections from the aperture of horn 20 to each input of 90 degree hybrid coupler 310 should be equal, the term 'electrical length' meaning the number of signal wavelengths propagating through the particular path. Particularly, the electrical length of the path extending through first low frequency band port 50, magic tee 100, the respective high frequency rejection filter 105, and any connection paths 320 therebetween, should be equal to the electrical length of the path extending through second low frequency band port 60, magic tee 100, the respective high frequency rejection filter 105, and any connection paths 330 therebetween. As a result, the phase shift of a signal propagating through the path from the aperture of horn 20 to the first input of 90 degree hybrid coupler 310 is equal to the phase shift of the signal propagating through the path from the aperture of horn 20 to the second input of 90 degree hybrid coupler 310.

The operation of antenna configuration 300 is in all respects similar to the operation of antenna configuration 10 of FIGS. 1A-1D, with the exception that antenna configuration 300 can also receive and transmit circularly polarized low frequency band signals 340 and 350, the polarity of low frequency band signal 340 opposing the polarity of low frequency band signal 350. As described above in relation to antenna configuration 10, the operation is described in the low frequency band receiving mode, however this is not meant to be limiting in any way. As described above, the low frequency band transmission mode is reciprocal, and otherwise identical, to the low frequency band receiving mode and in the interest of brevity will not be described. A half 342 of low frequency band signal 340 and a half 352 of low frequency band signal 350 enters first low frequency band port 50. The polarity of half 342 of low frequency band signal 340 is the same as the polarity of half 352 of low frequency band signal 350. Additionally, a half 344 of low frequency band signal 340 and a half 354 of low frequency band signal 350 enters second low frequency band port 60. The polarity of half 344 of low frequency band signal 340 opposes the polarity of half 354 of low frequency band signal 350. Low frequency band signals 340, 350 are output from magic tee 100 as linearly polarized signals and 90 degree hybrid coupled 310 is arranged to convert the linearly polarized low frequency band signals 340, 350 into circularly polarized signals, such that a received left hand signal 340 is output by 90 degree hybrid coupled 310 as a left hand signal and a received right hand signal 340 is output as a right hand signal.

FIG. 3 illustrates a high level flow chart of a method of dual band antenna transmission, according to certain embodiments. In stage 1000, a first low frequency band signal is transmitted between a horn and a first low frequency band port. The horn is coupled to a proximal section of a waveguide. The first low frequency band port extends, from an outer surface of the waveguide, along a first radial path. As described above, in a low frequency band receiving mode the first low frequency band signal is transmitted from the horn to the first low frequency band port. In a low frequency band transmission mode, the first low frequency band signal is transmitted from the first low frequency band port to the horn. Optionally, the transmission of the first low frequency band signal is only through a portion of the waveguide devoid of any barriers. As described above, the portion of the waveguide which the first low frequency band signal is transmitted through, e.g. proximal section 125 and low frequency band orthomode section 130 of waveguide 30, is devoid of any isolation barriers. Advantageously, the lack of isolation barriers means that high frequency band signals can be transmitted to the horn without being distorted.

In stage 1010, a second low frequency band signal is transmitted between the horn and a second low frequency band port. The second low frequency band port extends, from an outer surface of the waveguide, along a second radial path, the second radial path orthogonal to the first radial path. As described above, in a low frequency band receiving mode the second low frequency band signal is transmitted from the horn to the second low frequency band port. In a low frequency band transmission mode, the second low frequency band signal is transmitted from the second low frequency band port to the horn. Optionally, the transmission of the second low frequency band signal is only through a portion of the waveguide devoid of any barriers. The polarity of the second low frequency band port is orthogonal to the polarity of the first low frequency band port of stage 1000.

In stage 1020, a first high frequency band signal is transmitted between the horn and a first high frequency band port extending from a high frequency band section of the waveguide of stage 1000. As described above, the first high frequency band port can either be a receiving port or a transmitting port, similar to the first low frequency band port of stage 1000 and the second low frequency band port of stage 1010. Optionally, the first high frequency band port extends along a longitudinal axis of the waveguide. Optionally, the first high frequency signal transmission is through a tapered portion of the waveguide. As described above, the tapering of the waveguide is dimensioned so as to prevent the first and second low frequency band signals from interfering with the first high frequency band port and improves the multimode matching of the first high frequency band signal. Optionally, the high frequency band is a predetermined portion of the $K_a$ band and the low frequency band of stage 1000-1010 is a predetermined portion of the $K_u$ band.

In stage 1030, the first low frequency band signal of stage 1000 and the second low frequency band signal of stage 1010 are transmitted between the respective first and second low band frequency ports and respective first ports of a 180 degree hybrid coupler. Preferably, the 180 degree hybrid coupler is a magic tee and the first ports of the 180 degree hybrid coupler are the collinear ports of the magic tee.

In optional stage 1040, the transmission of the first and second low frequency band signals of stages 1000-1010 are responsive to: a first stub extending from the outer surface of the waveguide and opposing the first low frequency band port of stage 1000; and a second stub extending from the outer surface of the waveguide and opposing the second low frequency band port of stage 1010. Preferably, each of the first and second stubs is a closed stub. As described above, the first and second stubs provide improved isolation between the first and second low frequency band ports.

In optional stage 1050, a signal exhibiting a frequency within the high frequency band which exits the first low frequency band port towards the 180 degree hybrid coupler is attenuated. Additionally, a signal exhibiting a frequency within the high frequency band which exits the second low frequency band port towards the 180 degree hybrid coupler is attenuated. The attenuation prevents the high frequency band signals from distorting the low frequency band signals, as described above.

In optional stage 1060, a second high frequency band signal is transmitted between the horn and a second high frequency band port extending from the outer surface of the waveguide along a third radial path. The second high frequency band port is orthogonal to the first high frequency band port which extends along the longitudinal axis of the waveguide. Additionally, the polarity of the second high frequency band port is orthogonal to the polarity of the first high frequency band port.

In optional stage 1070, the first high frequency band signal of stage 1020 and the second high frequency band signal of optional stage 1060 is polarized. Optionally, the polarization is accomplished via a 90 degree phase shifter comprising dielectric material.

In optional stage 1080, the first and second low frequency band signals are transmitted between a sum port of the 180 degree hybrid coupler and a respective port of a 90 degree hybrid coupler, and between a difference port of the 180 degree hybrid coupler and a respective port of the 90 degree hybrid coupler.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

The invention claimed is:

1. A dual band antenna configuration comprising:
    a waveguide, said waveguide extending from a proximal section to a high frequency band section;
    a first high frequency band port extending from said high frequency band section of said waveguide;
    a first low frequency band port extending, from an outer surface of a low frequency section of said waveguide, along a first radial path;
    a second low frequency band port extending, from said outer surface of said low frequency section of said waveguide, along a second radial path, said second radial path orthogonal to said first radial path; and a 180 degree hybrid coupler,
wherein a first port of said 180 degree hybrid coupler in electrical communication with said first low frequency band port and a second port of said 180 degree hybrid coupler, different than said first port thereof, in electrical communication with said second low frequency band port.

2. The antenna configuration of claim 1, further comprising:
a first stub, said first stub extending from said outer surface of said waveguide and opposing said first low frequency band port; and
a second stub, said second stub extending from said outer surface of said waveguide and opposing said second low frequency band port.

3. The antenna configuration of claim 1, wherein said 180 degree hybrid coupler is a magic tee, said first port of said 180 degree hybrid coupler being a first collinear port of said magic tee and said second port of said 180 degree hybrid coupler being a second collinear port of said magic tee.

4. The antenna configuration of claim 1, wherein said proximal section and said low frequency band section of said waveguide are each devoid of any barriers.

5. The antenna configuration of claim 1, wherein said waveguide tapers from said low frequency band section to said high frequency band section.

6. The antenna configuration of claim 5, further comprising a second high frequency band port extending, from said outer surface of said waveguide at said high frequency band section, along a third radial path, said first high frequency band port extending along a longitudinal axis of said waveguide such that the polarity of said first high frequency band port is orthogonal to the polarity of said second high frequency band port, wherein said first and second high frequency band ports are arranged to transmit to, or receive from, said waveguide signals exhibiting frequencies in a high frequency band,
wherein said first and second low frequency band ports are arranged to transmit to, or receive from, said waveguide signals exhibiting frequencies in a low frequency band, and
wherein said taper is dimensioned such that:
the low frequency band signals do not proceed from said low frequency band section to said high frequency band section; and
the high frequency band signals are multimode matched.

7. The antenna configuration of claim 1, further comprising a pair of high frequency band filters,
wherein said first high frequency band port is arranged to transmit to, or receive from, said waveguide signals exhibiting frequencies in a high frequency band, and
wherein each of said high frequency band filters is arranged to attenuate signal frequencies within the high frequency band, an input of each of said pair of high frequency band filters coupled to a respective one of a sum port and a difference port of said 180 degree hybrid coupler.

8. The antenna configuration of claim 1, further comprising:
a second high frequency band port extending, from said outer surface of said waveguide at said high frequency band section, along a third radial path, said first high frequency band port extending along a longitudinal axis of said waveguide such that the polarity of said first high frequency band port is orthogonal to the polarity of said second high frequency band port.

9. The antenna configuration of claim 8, further comprising a polarizer positioned within said waveguide.

10. The antenna configuration of claim 1, further comprising a 90 degree hybrid coupler, each of a pair of terminals of said 90 degree hybrid coupler in electrical communication with a respective one of a sum port and a difference port of said 180 degree hybrid coupler.

11. The antenna configuration of claim 1, wherein said first high frequency band port is arranged to transmit to, or receive from, said waveguide signals exhibiting frequencies in a high frequency band,
wherein said first and second low frequency band ports are arranged to transmit to, or receive from, said waveguide signals exhibiting frequencies in a low frequency band, and
wherein the high frequency band is a predetermined portion of the $K_a$ band and the low frequency band is a predetermined portion of the $K_u$ band.

12. A dual band antenna transmission method comprising:
transmitting a first low frequency band signal between a proximal section of a waveguide and a first low frequency band port extending, from an outer surface of the waveguide, along a first radial path;
transmitting a second low frequency band signal between the proximal section of the waveguide and a second low frequency band port extending, from the outer surface of the waveguide, along a second radial path, the second radial path orthogonal to the first radial path;
transmitting a first high frequency band signal between the proximal section of the waveguide and a first high frequency band port extending from a high frequency band section of the waveguide; and
transmitting said first and second low frequency band signals between the respective first and second low band frequency ports and respective first ports of a 180 degree hybrid coupler.

13. The method of claim 12, wherein said first and second low frequency band signal transmission between the proximal section of the waveguide and the first and second low frequency band ports is responsive to:
a first stub extending from the outer surface of the waveguide and opposing the first low frequency band port; and
a second stub extending from the outer surface of the waveguide and opposing the second low frequency band port.

14. The method of claim 12, wherein the 180 degree hybrid coupler is a magic tee, the respective first ports of the 180 degree hybrid coupler being collinear ports of the magic tee.

15. The method of claim 12, wherein the first low frequency band signal transmission between the proximal section of the waveguide and the first low frequency band port and the second low frequency band signal transmission between the proximal section of the waveguide and the second low frequency band port is only through a portion of the waveguide devoid of any barriers.

16. The method of claim 12, wherein the first high frequency band signal transmission between the proximal section of the waveguide and the first high frequency band port is through a tapered portion of the waveguide.

17. The method of claim 16, further comprising:
transmitting a second high frequency band signal between the proximal section of the waveguide and a second high frequency band port extending from the outer surface of the waveguide along a third radial path, the first high frequency band port extending along a longitudinal axis of the waveguide such that the polarity of the first high frequency band port is orthogonal to the polarity of the second high frequency band port; and responsive to the dimensions of the tapered portion of the waveguide:
preventing said first low frequency band signal and said second low frequency band signal from proceeding through the tapered portion of the waveguide; and
multimode matching said first and second high frequency band signals.

18. The method of claim 12, further comprising:
attenuating a signal exhibiting a frequency within the high frequency band which exits the first low frequency band port towards the 180 degree hybrid coupler; and
attenuating a signal exhibiting a frequency within the high frequency band which exits the second low frequency band port towards the 180 degree hybrid coupler.

19. The method of claim 12, further comprising transmitting a second high frequency band signal between the proximal section of the waveguide and a second high frequency band port extending from the outer surface of the waveguide along a third radial path, wherein the first high frequency band port extends along a longitudinal axis of the waveguide such that the polarity of the first high frequency band port is orthogonal to the polarity of the second high frequency band port.

20. The method of claim 19, further comprising polarizing said transmitted first and second high frequency band signals.

21. The method of claim 12, further comprising:
transmitting said first and second low frequency band signals between a sum port of the 180 degree hybrid coupler and a respective port of a 90 degree hybrid coupler; and
transmitting said first and second low frequency band signals between a difference port of the 180 degree hybrid coupler and a respective port of the 90 degree hybrid coupler.

22. The method of claim 12, wherein the high frequency band is a predetermined portion of the $K_a$ band and the low frequency band is a predetermined portion of the $K_u$ band.

* * * * *